United States Patent
Bach

(10) Patent No.: US 10,543,464 B2
(45) Date of Patent: Jan. 28, 2020

(54) METHOD FOR MIXING OF PARTICLES

(71) Applicant: Novozymes A/S, Bagsvaerd (DK)

(72) Inventor: Poul Bach, Birkeroed (DK)

(73) Assignee: Novozymes A/S, Bagsvaerd (DK)

( * ) Notice: Subject to any disclaimer, the term of this patent is extended or adjusted under 35 U.S.C. 154(b) by 108 days.

(21) Appl. No.: 15/548,658

(22) PCT Filed: Feb. 10, 2016

(86) PCT No.: PCT/EP2016/052863
§ 371 (c)(1),
(2) Date: Aug. 3, 2017

(87) PCT Pub. No.: WO2016/128489
PCT Pub. Date: Aug. 18, 2016

(65) Prior Publication Data
US 2018/0001280 A1    Jan. 4, 2018

(30) Foreign Application Priority Data
Feb. 10, 2015  (EP) .................................... 15154444

(51) Int. Cl.
| | | |
|---|---|---|
| A23K 20/00 | (2016.01) | |
| B01F 3/18 | (2006.01) | |
| B01F 5/06 | (2006.01) | |
| A23K 20/189 | (2016.01) | |
| C11D 3/386 | (2006.01) | |

(52) U.S. Cl.
CPC .............. *B01F 3/18* (2013.01); *A23K 20/189* (2016.05); *B01F 5/0602* (2013.01); *C11D 3/38609* (2013.01); *C11D 3/38672* (2013.01); *B01F 2215/044* (2013.01); *B01F 2215/0431* (2013.01)

(58) Field of Classification Search
CPC .. B01F 3/18; B01F 2215/0431; B01F 5/0602; B01F 2215/044; A23K 20/189; C11D 3/38609; C11D 3/38672
See application file for complete search history.

(56) References Cited

U.S. PATENT DOCUMENTS

| | | | |
|---|---|---|---|
| 3,572,405 A | 3/1971 | Mattson | |
| 4,106,991 A | 8/1978 | Markusson | |
| 4,636,473 A * | 1/1987 | Kleinstreuer | .......... C12M 23/06 |
| | | | 210/108 |
| 6,705,358 B1 * | 3/2004 | Tortorici, Jr. | ......... B01F 3/0865 |
| | | | 137/268 |
| 7,748,312 B2 * | 7/2010 | Pfaller | ..................... A21C 3/04 |
| | | | 426/512 |
| 2008/0054220 A1 * | 3/2008 | Lyons | .................. A61K 9/1647 |
| | | | 252/182.12 |
| 2011/0001265 A1 * | 1/2011 | Walia | ..................... B01F 5/246 |
| | | | 264/299 |

FOREIGN PATENT DOCUMENTS

| | | |
|---|---|---|
| DE | 4128247 A1 | 3/1993 |
| WO | 1991/04669 A1 | 4/1991 |
| WO | 1992/12645 A1 | 8/1992 |
| WO | 1996/23062 A1 | 8/1996 |
| WO | 1998/26057 A1 | 6/1998 |
| WO | 2000/01793 A1 | 1/2000 |
| WO | 2000/24877 A2 | 5/2000 |
| WO | 2001/04279 A1 | 1/2001 |
| WO | 2003/000625 A2 | 1/2003 |
| WO | 2006/021687 A1 | 3/2006 |
| WO | 2006/034710 A1 | 4/2006 |
| WO | 2007/044968 A2 | 4/2007 |
| WO | 2011/134809 A1 | 11/2011 |

* cited by examiner

*Primary Examiner* — Anshu Bhatia
(74) *Attorney, Agent, or Firm* — Eric J. Fechter

(57) ABSTRACT

Continuous mixing in a static mixer possible can be used to add one kind of particles (such as an enzyme granular product) in a small amount to a larger amount of a different kind of particles (such as a powder stream of detergent powder), even if the powder characteristics are substantially different, with substantially no damage to the enzyme particles and with a high degree of homogeneity.

20 Claims, No Drawings

METHOD FOR MIXING OF PARTICLES

CROSS-REFERENCE TO RELATED APPLICATIONS

This application is a 35 U.S.C. 371 national application of international application no. PCT/EP2016/052863 filed Feb. 10, 2016 which claims priority or the benefit under 35 U.S.C. 119 of European application no. 15154444.2 filed Feb. 10, 2015, the contents of which are fully incorporated herein by reference.

FIELD OF THE INVENTION

The present invention relates to a method for mixing of at least two kinds of particles, particularly mixing of a small amount of one kind of particles with a larger amount of a different kind of particles.

BACKGROUND

Dry mixing of a small amount of one kind of particles into a larger amount of a different kind of particles is used, e.g., for mixing of enzyme particles into powder detergents or animal feed.

The current technology used to mix enzyme granules into powdered detergent products includes rotary drum mixers, which are able to mix small amounts of granular enzyme products efficiently without causing damage to the enzyme granules. Drum mixers are, however, large and costly process equipment. In addition is takes up substantial amount of space in the detergent manufacturing plants. This makes the introduction of enzymes into new plants costly and difficult. Mixing of liquids with liquids or mixing of gases are on the contrary done very easily and efficiently using so-called static mixers, which are very compact and inexpensive equipment and used for many years throughout the process industry. Application of static mixers for mixing powders are, however, very scarce. Only few papers have been published on attempt to use static mixers for mixing dry or essentially dry powder streams. Powders are inherently more difficult to handle than liquids. The multi-phase nature of powder flows are still not very well understood despite the advancement of sophisticated modeling and simulation tools becoming available; such as CFD (Computational Fluid Dynamics) and DEM (Discrete Element Method). No single theory is, however, able to accurately describe powder flows. These difficulties have led the industry to staying with current mixing technology such as rotating drum and paddle mixers.

Generally the same technology is used to produce blends of two or more kinds of enzyme particles, e.g. enzyme granules with different kinds of detergent enzymes.

Static mixers have the drawbacks of being difficult to apply for powder mixing due to the lack of understanding of powder flows and mixing. In addition the mechanical constructions contain by nature sharp mixing elements, which potentially could damage sensitive particles. It is also known that the mixing quality is strongly dependent on the flow patterns in the mixer, the relative densities and particle size distributions of the powders to be mixed.

SUMMARY OF THE INVENTION

The inventors have found that continuous mixing in a static mixer can be used to add one kind of particles (such as an enzyme granular product) in a small amount to a larger amount of a different kind of particles (such as a powder stream of detergent powder), even if the powder characteristics are substantially different, with substantially no damage to the enzyme particles without and with a high degree of homogeneity.

Accordingly, the invention provides a method for mixing of at least two kinds of particles, wherein a first and a second stream of particles are mixed in a static mixer, and wherein the first and the second stream of particles have a weight ratio below 1:20.

The mixing quality (or mixing homogeneity) of the two kinds of particles is a key feature of the invention. Thus, in the resulting mixture of the first and second stream of particles, the coefficient of variation of the amount of particles from the first stream, preferably enzyme particles, is less than 50%, preferably less than 40%, more preferably less than 30%. The coefficient of variation may be measured using at least 9 samples and a sample size of approximately 5 g, and preferably 0.3 wt. % particles from the first stream. If an analytical method is used to determine the amount of particles from the first stream, the coefficient of variation of the analytical method must be subtracted from the measured coefficient of variation.

Another key feature of the invention, when the first stream of particles is enzyme particles, is that the level of free enzyme dust in the resulting mixture is surprisingly low, as shown in the Examples. Thus, the resulting mixture of the enzyme particles and the second stream of particles may have an amount of free enzyme dust below 20 parts per billion, using the standard fluidization assay (J. Liu et al., Building and Environment, 44 (2009), 2327-2334).

The invention also provides a method for mixing of at least two kinds of enzyme particles, wherein a first and a second stream of enzyme particles are mixed in a static mixer.

DETAILED DESCRIPTION

First Particle Stream

The first particle stream typically comprises one or more kinds of enzyme particles or other active or functional particles, such as bleach activators, polymers, colorants, perfume particles etc. The enzyme particles typically have particle sizes in the range 100-2000 µm, preferably an average particle size in the range 300-1200 µm. They generally consist of a core comprising the enzyme surrounded by a coating. The core may additionally comprise finely divided cellulose fibers. The coating may comprise a wax such as polyethylene glycol or a salt such as sodium sulfate. Some formulations of enzyme particles are described in U.S. Pat. No. 4,106,991, WO9212645, WO0001793, WO0104279, WO06034710, WO2011134809, WO200024877, WO2003000625 and WO2007044968.

Second Particle Stream

As examples, the second powder stream may consist of powder detergent (granular detergent), animal feed or flour premix for baking where it is of interest to add minor ingredients in very small dosages. The particles should be free flowing as determined by an angle of repose being less than 45°, particularly less than 40° or less than 35°.

Thus, the invention may be used to add minor ingredients such as enzyme particles to powder detergent (granular detergent), Relevant enzymes include one or more of the following: a protease, an amylase, a carbohydrase, a lipase, a cellulase, an oxidoreductase, a mannanase and a pectate lyase. Examples are described in U.S. Pat. No. 4,106,991, WO9212645, WO0001793, WO0104279, WO2011134809, WO200024877 or WO 2003000625.

Another example is the addition of feed enzymes to animal feed. Relevant enzymes include one or more of the following: a protease, an amylase, a carbohydrase, a lipase, a cellulase, and a phosphatase such as phytase. Examples are described in WO9212645, WO2001/004279, WO06034710, WO2007044968, WO9623062.

The invention may also be used to add enzymes to a flour premix for baking. Relevant enzymes include alpha-amylase. maltogenic amylase, lipase, phospholipase, xylanase. Examples are described in WO9104669, WO9826057.

Mixing of Enzyme Particles

A static mixer can also be used for mixing of two or more kinds of enzyme particles. Examples of relevant enzymes are those listed above.

Static Mixer

The static mixer is a device which can provide continuous mixing of streams of solid particles using no moving components. It may be a helical mixer consisting of mixer elements housed in a cylindrical tube, where the static mixer elements consist of a series of baffles. The static mixer should have a diameter which is at least 10 times of the particle size.

EXAMPLES

Example 1-3

In-line Mixing of Enzyme into Detergent Powder

Streams of two types of particles were used, as follows:
(a) Detergent: commercial European powder detergent without enzyme.
(b) Enzyme: Commercial protease granules (Savinase™, product of Novozymes A/S). The average particle size is in the range 300-1200 microns.

The equipment for dosing and mixing was as follows:
The detergent powder and the enzyme granules were each dosed by a vibrating feeder giving essential constant volumetric flow rates. A flow rate of 20 kg/min (+/−1 kg/min) was used for dosing the detergent powder and the enzyme feeder set-point was set to dose 16, 31, and 62 g enzyme/min., corresponding to with dosages of 0.15%, 0.3 and 0.6% of enzyme by weight, respectively.

Measurements were done as follows:
Full flow samples were collected over 1 minute corresponding to about 20 kg. The homogeneity of the mixing was measured by scooping out nine samples (2a, 2b, 2c, 4a, 4b, 4c, 6a, 6b, 6c) of ~5 g scoop size randomly from each test. It was secured that no additional mixing took place during the sampling procedure.

The results were as shown in the following Tables.

TABLE 1

| Sample ID | Enzyme granules [wt. %] | Scoop size [g] | Product activity [activity units/scoop] |
|---|---|---|---|
| Example-1-2a | 0.6 | 5.15 | 0.201 |
| Example-1-2b | 0.6 | 5.14 | 0.171 |
| Example-1-2c | 0.6 | 5.21 | 0.167 |
| Example-1-4a | 0.6 | 5.18 | 0.364 |
| Example-1-4b | 0.6 | 5.18 | 0.345 |
| Example-1-4c | 0.6 | 5.22 | 0.352 |
| Example-1-6a | 0.6 | 5.23 | 0.281 |
| Example-1-6b | 0.6 | 5.18 | 0.278 |
| Example-1-6c | 0.6 | 5.26 | 0.294 |

TABLE 2

| Sample ID | Enzyme granules [wt. %] | Scoop size [g] | Product activity [activity units/scoop] |
|---|---|---|---|
| Example-2-2a | 0.3 | 5.17 | 0.0787 |
| Example-2-2b | 0.3 | 5.19 | 0.1100 |
| Example-2-2c | 0.3 | 5.18 | 0.0988 |
| Example-2-4a | 0.3 | 5.22 | 0.0726 |
| Example-2-4b | 0.3 | 5.24 | 0.1080 |
| Example-2-4c | 0.3 | 5.24 | 0.1310 |
| Example-2-6a | 0.3 | 5.16 | 0.0832 |
| Example-2-6b | 0.3 | 5.18 | 0.0801 |
| Example-2-6c | 0.3 | 5.21 | 0.0681 |

TABLE 3

| Sample ID | Enzyme granules [wt. %] | Scoop size [g] | Product activity [activity units/scoop] |
|---|---|---|---|
| Example-3-2a | 0.15 | 5.22 | 0.0664 |
| Example-3-2b | 0.15 | 5.16 | 0.0534 |
| Example-3-2c | 0.15 | 5.19 | 0.0480 |
| Example-3-4a | 0.15 | 5.19 | 0.0304 |
| Example-3-4b | 0.15 | 5.17 | 0.0706 |
| Example-3-4c | 0.15 | 5.16 | 0.0340 |
| Example-3-6a | 0.15 | 5.14 | 0.0514 |
| Example-3-6b | 0.15 | 5.15 | 0.0363 |
| Example-3-6c | 0.15 | 5.21 | 0.0468 |

TABLE 4

Mixing homogeneity as function of dose.

| Enzyme granules (scoop size: 5 g) | Mean | Std. Dev. | Cv measured | Cv minimum |
|---|---|---|---|---|
| 0.15 wt. % | 0.049 | 0.014 | 28% | 24.7% |
| 0.3 wt. % | 0.092 | 0.021 | 23% | 17.5% |
| 0.6 wt. % | 0.273 | 0.077 | 28% | 12.4% |

The mixing quality is determined by doing activity analysis of a number of scoops of product taken randomly. The scoop size is selected according to the application.

The best mixing quality that is possible to achieve corresponds to a statistical random distribution of the enzyme particles among the particles of the major powder stream(s). From the particle size distribution it is possible to calculate the distribution of the number of particles which is in a completely randomly mixed product for a given dosage and a given sample size (also called scoop size). When the distribution is known the standard deviation of the total amount of enzyme present in a scoop may be calculated. The average value will be equal to the dosage, so the Cv (coefficient of variation) can be calculated as the standard deviation divided by the average value. In Table 4, this Cv (Cv min) has been calculated for the three different dosages and a scoop size of 5 g. It is seen that the measured Cv, which includes the fixed value of the analytical Cv of the enzyme assay, gets close to the best possible Cv—especially for the smaller enzyme dosages.

The amount of free enzyme dust that is present in a sample is measured using a standard fluidization assay (J. Liu et al., Building and Environment, 44 (2009), 2327-2334). Table 5 shows the obtained results for the three tested dose levels: 0.15, 0.3 and 0.6 wt. % enzyme. The results are plotted in units of PPB (parts per billion or ng ($10^{-9}$ g) active enzyme/g product. The blank-level of the method is ~2 ng/g, and typical commercial laundry powders have active enzyme dust levels in the range 5-20 ng/g. Thus, the results show an extremely low level of active dust in all samples.

TABLE 5

| Sample ID | Enzyme granules [wt. %] | Total dust [mg/60 g] | Active dust [ng/g product] |
|---|---|---|---|
| Example-1-2a | 0.6 | 855 | 2.21 |
| Example-1-2b | 0.6 | 875 | 2.04 |
| Example-1-4a | 0.6 | 1390 | 3.60 |
| Example-1-4b | 0.6 | 1170 | 3.03 |
| Example-1-6a | 0.6 | 960 | 4.30 |
| Example-1-6b | 0.6 | 952 | 7.85 |
| Example-2-2a | 0.3 | 1140 | 2.96 |
| Example-2-2b | 0.3 | 899 | 2.93 |
| Example-2-4a | 0.3 | 1680 | 5.74 |
| Example-2-4b | 0.3 | 1490 | 7.26 |
| Example-2-6a | 0.3 | 966 | 2.47 |
| Example-2-6b | 0.3 | 1000 | 2.48 |
| Example-3-2a | 0.15 | 861 | 1.55 |
| Example-3-2b | 0.15 | 668 | 3.28 |
| Example-3-4a | 0.15 | 1200 | 1.93 |
| Example-3-4b | 0.15 | 990 | 2.35 |
| Example-3-6a | 0.15 | 1020 | 0.98 |
| Example-3-6b | 0.15 | 1180 | 2.26 |

The results demonstrate efficient mixing to a high degree of homogeneity, with a coefficient of variation close to the theoretical value for the sample size and particle size in question. The results also demonstrate an extremely low dust formation, well below the commonly accepted limit of 60 ng/m$^3$.

The invention claimed is:

1. A method for mixing of at least two kinds of particles, wherein a first and a second stream of particles are mixed in a static mixer, wherein the first stream comprises enzyme particles, wherein the resulting mixture of the enzyme particles and the second stream of particles has an amount of free enzyme dust below 20 parts per billion, and wherein the first and the second stream of particles have a weight ratio below 1:20.

2. The method of claim 1 wherein the weight ratio is below 1:50.

3. The method of claim 1, wherein the average particle size of the first stream of particles is in the range 100-2000 μm.

4. The method of claim 1, wherein the average particle size of the first stream of particles is in the range 300-1200 μm.

5. The method of claim 1, wherein the coefficient of variation of the amount of particles from the first stream, in the resulting mixture of the first and second stream of particles, is less than 40%.

6. The method of claim 5, wherein the coefficient of variation is measured using at least 9 samples and a sample size of at least 5 g.

7. The method of claim 1, wherein the enzyme particles comprise a protease, an amylase, a carbohydrase, a lipase, a cellulase, an oxidoreductase, a mannanase or a pectate lyase or a phosphatase, or a deoxyribonuclease.

8. The method of claim 1, wherein the second stream comprises detergent granules or detergent powder particles.

9. The method of claim 1, wherein the second stream comprises animal feed particles.

10. The method of claim 1, wherein the second stream comprises flour.

11. The method of claim 1 wherein the weight ratio is in the range from 1:1000 to 1:100.

12. The method of claim 1 wherein the weight ratio is in the range from 1:500 to 1:125.

13. A method for mixing of at least two kinds of particles, wherein a first and a second stream of particles are mixed in a static mixer, wherein the coefficient of variation of the amount of particles from the first stream in the resulting mixture of the first and second stream of particles is less than 40%, wherein the coefficient of variation is measured using at least 9 samples and a sample size of at least 5 g, and wherein the first and the second stream of particles have a weight ratio below 1:20.

14. The method of claim 13, wherein the ratio is below 1:50.

15. The method of claim 13, wherein the weight ratio is in the range from 1:500 to 1:125.

16. The method of claim 13, wherein the average particle size of the first stream of particles is in the range 100-2000 μm.

17. The method of claim 13, wherein the average particle size of the first stream of particles is in the range 300-1200 μm.

18. The method of claim 13, wherein the second stream comprises detergent granules or detergent powder particles.

19. The method of claim 13, wherein the second stream comprises animal feed particles.

20. The method of claim 13, wherein the second stream comprises flour.

* * * * *